United States Patent
Weelink

[19]
[11] Patent Number: 5,544,622
[45] Date of Patent: Aug. 13, 1996

[54] BUILDING FOR ACCOMMODATING LIVESTOCK

[76] Inventor: Johannes M. W. Weelink, No. 58, Tynaarlosestraat, NL-9481 AD Vries, Netherlands

[21] Appl. No.: 341,094

[22] Filed: Nov. 17, 1994

[30] Foreign Application Priority Data

Nov. 18, 1993 [NL] Netherlands ............ 9302000

[51] Int. Cl.⁶ ............................................. A01K 1/00
[52] U.S. Cl. .................................. 119/436; 119/437
[58] Field of Search .................. 119/16, 21; 454/275, 454/333

[56] References Cited

U.S. PATENT DOCUMENTS 3,556,055  1/1971  Wenger ............................ 119/16
4,574,737  3/1986  Bugeja ............................. 119/16

FOREIGN PATENT DOCUMENTS 2527671   12/1983  France.
1609951   6/1970   Germany.
2910447   9/1980   Germany.
8426219.2 7/1987   Germany.

OTHER PUBLICATIONS

252 Landbouwmechanisatie, 36 (1985) Dec., No. 12, Wageningen, Nederland to B. van Maanen.

Primary Examiner—Robert P. Swiatek
Attorney, Agent, or Firm—Evenson, McKeown, Edwards & Lenahan

[57] ABSTRACT

A building for accommodating livestock with a roof having two roof parts extending obliquely downward from a ridge, wherein transparent plate material extends parallel to the ridge, the ends edges of which plate material close to the ridge form between them a ventilation slot. At a distance above the ventilation slot a roof cap is arranged with a width greater than that of the ventilation slot.

12 Claims, 2 Drawing Sheets

BUILDING FOR ACCOMMODATING LIVESTOCK

The invention relates to a building for accommodating livestock with a roof which comprises ventilation openings close to the ridge.

It is known to cover such a roof with corrugated plates and to arrange a roof cap close to the ridge, wherein ventilation openings are formed between the roof cap and the valleys of the corrugated plate.

The invention has for its object to further improve such a building.

This object is achieved with the steps of claim 1. A very good ventilation is hereby obtained, while light is moreover allowed through over a relatively large area, whereby the lighting inside the building or shed is favourable.

According to a further favourable development the step of claim 2 is applied. The standing edges prevent sudden blasts of wind inside the ventilation slot. The wind blows over the roof cap so that ventilation is intensified as a result of a venturi effect.

Through application of the step of claim 3 the total light-transmitting area is further enlarged, which brings about a pleasant lighting inside the building or shed.

The step of claim 4 herein provides a good wind guiding, which enhances the ventilation.

Depending on the local conditions and for instance the time of year, it may be desired to increase or reduce the ventilation options. The step of claim 5 is preferably applied for this purpose.

In order to enable a simpler adaptation of the ventilation requirement the step of claim 6 is preferably applied.

A suitable construction is characterized in claim 7. Transparent plate material is for instance manufactured from plastic and quite lightweight, whereby a central ridge beam is not needed to take up the weight. The free transparent surface and the free through-flow of air are thus enhanced.

The step of claim 8 is preferably applied to support the roof cap and optionally the transparent plate material close to the end edges.

A suitable construction is herein characterized in claim 9.

The invention is further elucidated in the following description with reference to the embodiments shown in the figures.

Figure 1:
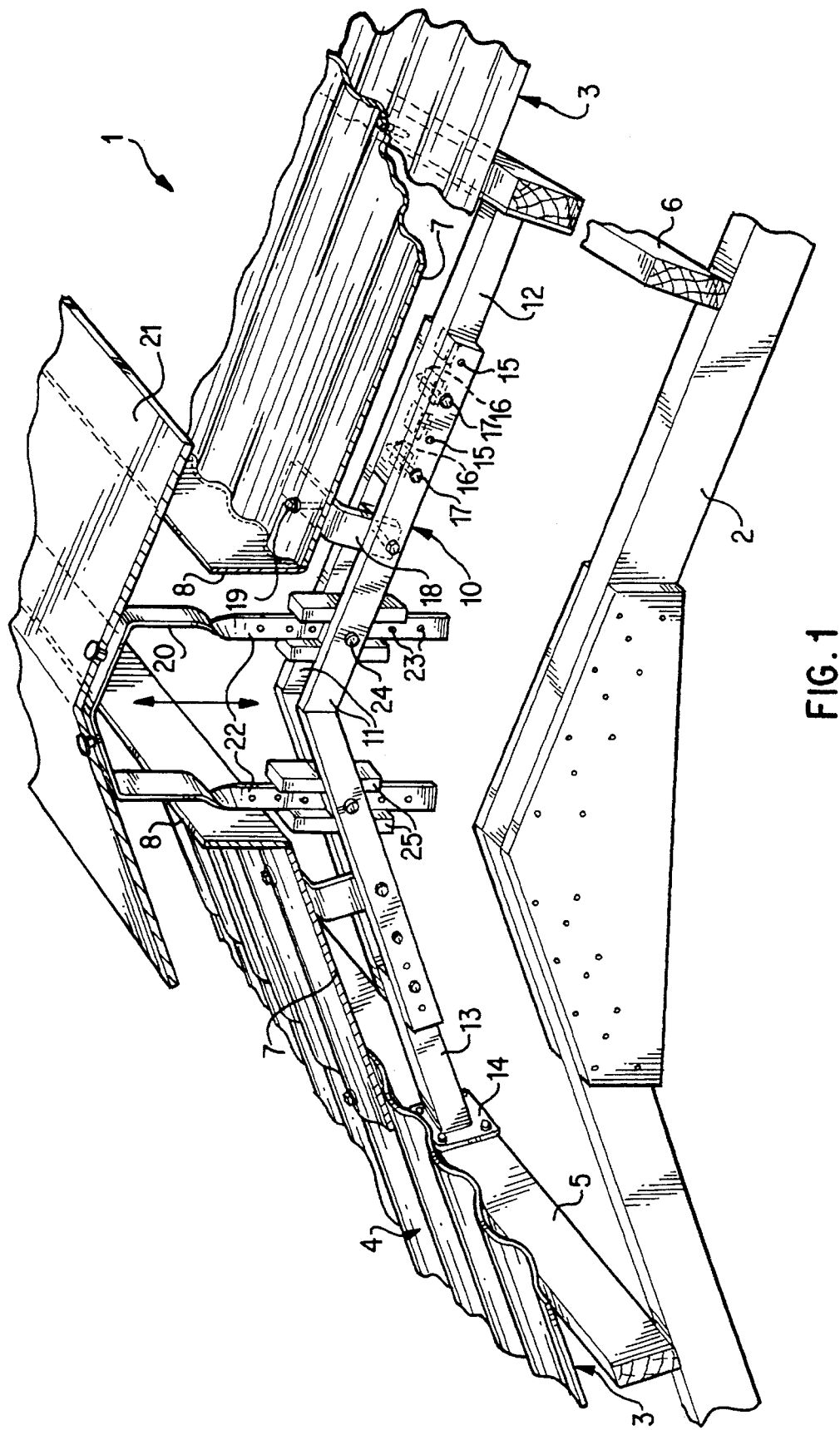
FIG. 1 shows a partly broken away perspective view of a preferred embodiment of the building according to the invention at the position of the ridge.

The roof 1 of a building according to the invention shown in FIG. 1 comprises a number of rafters 2, one of which is shown in FIG. 1.

As shown in the figure, the roof 1 is of the type with a ridge having two roof parts 3, 4 extending obliquely downward from the ridge.

Arranged on the rafters 2 is a number of longitudinal beams onto which corrugated plates are fixed in the usual manner. FIG. 1 shows two longitudinal beams 5, 6 at a distance parallel to the ridge. Between these longitudinal beams 5, 6 the roof 1 is free of bearing parts extending parallel to these longitudinal beams. Since the plate material of the roof extending between these longitudinal beams 5, 6 is preferably transparent, as will be described further, outside light can penetrate practically without hindrance into the interior of the building over the considerable width between the longitudinal beams 5 and 6. An agreeably high level of light is thus obtained in the interior of the building or shed.

Transparent plate material 7 extends parallel to the ridge on either side thereof from the longitudinal beams 5, 6. This plate material 7 has standing end edges 8. The end edges can be formed integrally with the remaining portion of the plate material or be arranged separately thereon, for instance by means of glueing. The pieces of plate material 7 are fixed onto the beams 5, 6 by means of fastening bolts 19 usual for this purpose.

The standing edge 8 has the effect that the plate material has bending stiffness close to the end edge. A fixing of the plate 7 close to the end edge at comparatively large intervals can hereby suffice.

In addition to the stiffening function the standing end edges 8 also have a further function in improving the ventilation, which function will be further described.

Transverse supports 10 extend between the longitudinal beams 5, 6 at regular intervals. These transverse supports serve on the one hand to fix the plates 7 and on the other to support the roof cap 21. Because of the inherent stiffness of the plate material 7 the distance between the transverse supports 10 can be comparatively large.

Each transverse support 10, only one of which is shown in FIG. 1, is formed in the embodiment shown by two reverse V-shaped parts 11 having mounting elements 12, 13 protruding therebetween at the ends. On their protruding ends the mounting elements 12, 13 are provided with a mounting plate 14 for fixing to the longitudinal beams 5, 6.

Arranged in the mounting elements 12, 13 is a number of slotted holes 16, which are drawn in FIG. 1 in dotted lines. Corresponding bores 15 are formed in the reverse V-shaped parts. The elements 12, 13 are mounted by means of bolts 17 to the V-shaped parts 11, wherein these bolts extend through respectively the holes 15 and the slotted holes 16. The mounting elements 12, 13 can thus be mounted adjustably in lengthwise direction. Since the distance between longitudinal beams 5, 6 is not always constant in existing building structures, an adaptation to the existing situation can hereby be carried out in simple manner.

Received on either side between the V-shaped parts is an L-shaped support 18 to which the associated plate 7 is fixed by means of a bolt 19.

A bracket 20 is further received between the reverse V-shaped parts close to the ridge. Bracket 20 is formed from strip and the legs of the bracket are twisted so that the lower ends thereof lie in one plane. Into these bottom ends or legs 22 is bored a number of holes 23 which correspond with holes in the transverse support 10 such that bolts 24 can be placed through the transverse support and the legs. In accordance with which of the holes 23 is chosen for placing therethrough of the bolts 24, the bracket 20 can be adjusted to a higher or lower position and the roof cap 21 thus adjusted to the desired height above the end edges 8.

As noted, the roof cap 21 is itself manufactured from transparent material. This is fixed to bracket 20 in suitable manner, for instance with bolt connections.

The height adjustment of roof cap 21 is such that this roof cap can be lowered onto the edge of the end edges 8, whereby the ventilation slot defined between end edges 8 is entirely closed. Conversely, the roof cap 21 can be adjusted upward through a considerable height, thus forming a very large ventilation opening.

The ventilation is obtained on the one hand in that the air inside the building is generally warmer than that outside, whereby the former automatically escapes through the opening as a result of its lower weight.

Wind has an intensifying effect on the ventilation. When wind blows across the roof it is directed over the roof cap 21. Due to inertia the air over the ridge does not move directly downward again, whereby suction occurs on the leeward side, whereby air is drawn out of the interior of the building. The standing edges 8 prevent wind blowing over the roof from flowing inside between the roof cap and the roof into the ventilation opening, whereby the ventilation will be decreased. The standing end edges 8 form a barrier to the inflow of ambient air.

The ventilation obtained with the described construction can be so great that it is desirable for it to be limited in particular conditions, for instance in the winter or in the case of strong wind. The construction shown in FIG. 1 is suitable only if an adaptation for seasonal influences is desired. The height of the roof cap 21 then only has to be adjusted a few times a year by removing the bolts, shifting and re-securing the bracket 20. The guides 25 ensure that bracket 20 moves perpendicularly up and downward.

Figure 2:
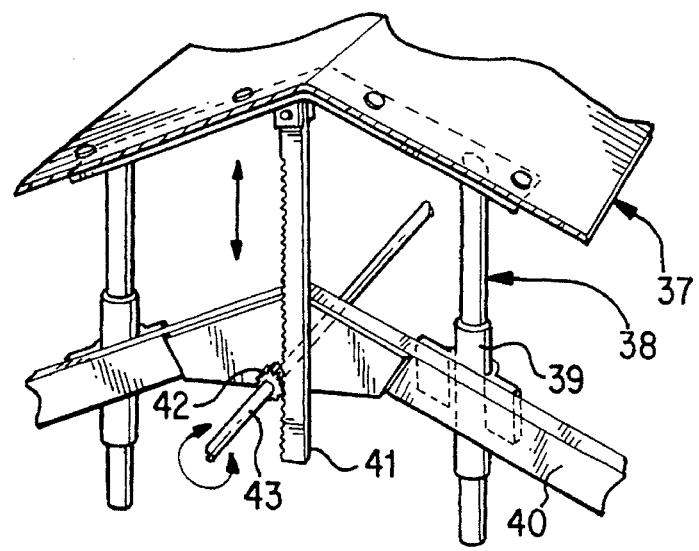
FIGS. 2, 3 and 4 show alternative embodiments of the roof cap construction.
Figure 3:
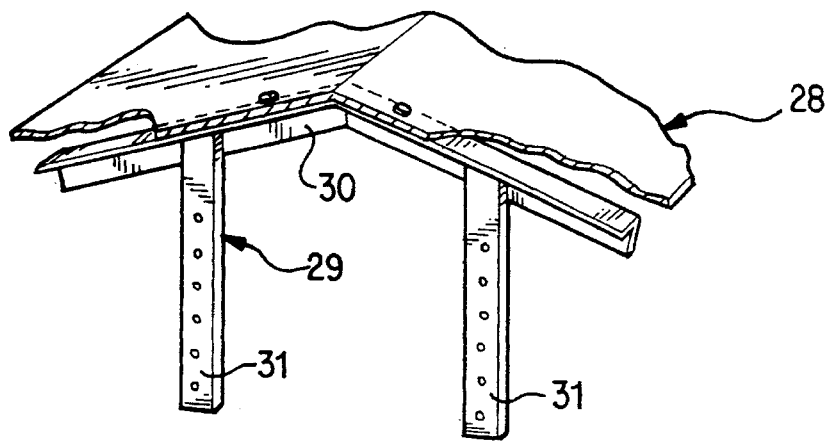

FIGS. 2 and 3 show alternative embodiments of the supporting brackets for the roof cap.

FIG. 3 shows that the roof cap 28 is supported by a bracket 29 which is assembled from a V-shaped element formed by two angle profiles welded together. Fixedly welded to the vertical leg of this angle profile are two legs 31 which are provided with holes for adjusting the height of roof cap 28.

Figure 4:
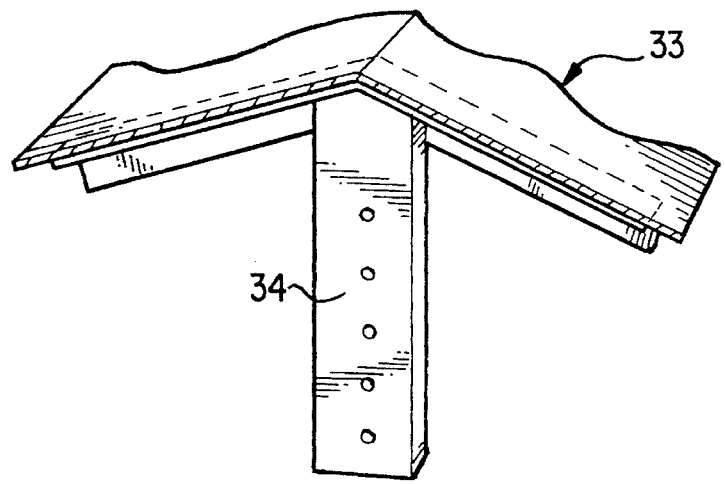

In the alternative of FIG. 4 the roof cap 33 is supported by an arrow-like support 34. The single leg of support 34 is fixed between the reverse V-shaped parts of transverse support 10 in a manner similar to both legs 22 in FIG. 1. If it is desired to adjust the height of the roof cap more frequently, for example to adapt to the weather conditions, an embodiment as shown in FIG. 2 is suitable. The roof cap 37 is therein supported by a support 38 which comprises two vertical guide rods. These latter are received in guide bushes 39 which are fixedly mounted to transverse support 40, which has a construction here other than that shown in FIG. 1. The guides 39 ensure together with the guide rods that the roof cap 37 is easy to slide vertically.

Mounted to the roof cap support is a gear rack 41 which is in engagement with a pinion 42 on a rod 43 which extends in lengthwise direction along the ridge.

The roof cap construction is embodied in the same manner close to each transverse support 40. All pinions 42 are thus connected. By turning the shaft 43 the roof cap 37 can thus be moved up and downward.

Driving of rod 43 can take place manually but a motor drive is of course also possible. In that case switching on and off of the motor can be controlled with a control device which responds for instance to wind speed, temperature and degree of humidity inside and outside the building and the like.

I claim:

1. Building for accommodating livestock with a roof having two roof parts extending obliquely downward from a ridge, wherein transparent plate material extends parallel to the ridge, the end edges of which plate material close to the ridge form between them a ventilation slot and wherein at a distance above the ventilation slot a roof cap is arranged with a width greater than that of the ventilation slot, wherein longitudinal beams of the roof extend at a distance parallel to the ridge, from which beams the transparent plate material extends.

2. Building as claimed in claim 1, wherein the end edges of the plate material are standing end edges.

3. Building as claimed in claim 1, wherein the roof cap is of transparent plate material.

4. Building as claimed in claim 1, wherein the roof cap has a reverse V-shaped section with an apex angle substantially equal to the angle between the roof parts.

5. Building as claimed in claim 1, wherein the roof cap is mounted height-adjustably.

6. Building as claimed in claim 5, comprising remotely controllable drive means for height adjustment of the roof cap.

7. Building as claimed in claim 1, wherein transverse supports on which the roof cap is mounted extend at regular intervals between the longitudinal beams.

8. Building as claimed in claim 7, wherein each transverse support comprises two parallel reverse V-shaped elements having mounting elements protruding therebetween at the ends for fixing to the beams and a support for the roof cap protruding therebetween close to the middle.

9. Building as claimed in claim 8, wherein the mounting elements can be clamped fixedly in different positions between the V-shaped elements.

10. Building as claimed in claim 8, wherein the support can be clamped fixedly in different positions between the V-shaped elements.

11. Building as claimed in claim 8, wherein the mounting elements and the support can be clamped fixedly in different positions between the V-shaped elements.

12. Building as claimed in claim 1, wherein the roof between the longitudinal beams is free of bearing parts extending parallel thereto.

* * * * *